United States Patent Office 3,352,798
Patented Nov. 14, 1967

3,352,798
CROSS-LINKING COATING POLYMERS
WITH POLYSULFONAZIDES
David S. Breslow and Frank E. Piech, Wilmington, Del., assignors to Hercules Incorporated, a corporation of Delaware
No Drawing. Filed June 17, 1964, Ser. No. 375,947
12 Claims. (Cl. 260—2)

This invention relates to cross-linking polymers and to the vulcanizates so produced. More particularly, the invention relates to cross-linking certain coating polymers with polysulfonazides.

Nitrocellulose, ethyl cellulose, saturated alkyds, triallyl pentaerythritol derivatives, chlorinated rubber, poly (ethylene oxide) and vinylidene chloride-acrylonitrile copolymers are well known for their ability to be formulated into coating compositions. However, the end products all suffer a serious drawback in that they tend to be soft, soluble in most organic solvents, and low in chemical and heat resistance.

It has now been discovered that the above polymers can be cross-linked by heating in the presence of a polysulfonazide to produce vulcanizates that are solvent resistant, have increased hardness, stiffness, and chemical and heat resistance.

The polymers which can be cross-linked in accordance with this invention are nitrocellulose, varying in nitrogen content from 10.5 to 13.5 percent and varying in viscosity from ⅛ sec. to 100 sec. (ASTM D 301–56), ethyl cellulose, the saturated alkyl resins, including coconut oil modified phthalic alkyds, and castor oil modified sebacic acid alkyds, chlorinated rubber as described in U.S. Patents 1,826,275, 2,275,469, 2,375,958, 2,382,353, 2,401,-133 and 2,401,194, poly(ethylene oxide), the triallyl pentaerythritol ethers, such as the diallylidene pentaerythritol ether of triallyl pentaerythritol, the triallyl pentaerythritol esters such as the linseed acid ester of triallyl pentaerythritol, and vinylidene chloride-acrylonitrile copolymers.

Any polysulfonazide, i.e., any compound having the general formula $R(SO_2N_3)_x$ where R is an organic grouping inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals, however, these radicals can also contain ether, alcohol, etc., groups which are inert to the cross-linking reaction. Exemplary sulfonazides are 1,5-pentane bis(sulfonazide), 1,10-decane bis(sulfonazide), 1,4-cyclohexane bis(sulfonazide), 1,3-benzene bis(sulfonazide), 1-octyl-2,4,6-benzene tris(sulfonazide), 4,4'-diphenylmethane bis (sulfonazide), α,α'-m-xylene bis(sulfonazide), 4,4'-diphenylether bis(sulfonazide), 4,4'-bis octadecyl biphenyl-3,5,3',5'-tetra(sulfonazide), 4,4'-diphenyldisulfide bis (sulfonazide), 1,6-bis(4'-sulfonazidophenyl) hexane, 2,7-naphthalene bis(sulfonazide), polysulfonazides of chlorinated aliphatic hydrocarbons, etc.

The cross-linking process of this invention can be carried out by heating the polymer plus the polysulfonazide to a temperature at which the sulfonazide decomposes. The temperature will vary over a wide range, but in general will be in the range of from about 100° C. to about 250° C. Various amounts of the cross-linking agent can be added, the optimum amount depending on the amount of cross-linking desired, the specific sulfonazide employed, etc. In general, the amount added, based on the weight of the polymer, will be from about 0.1% to about 25%.

The cross-linking agent can be incorporated with the polymer in any desired fashion. For example, it can be uniformly blended by simply milling, dissolved or dispersed in a solution containing the polymer, or dissolved or dispersed in a latex containing the polymer. By these means, the polysulfonazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can be incorporated in the polymer. Exemplary of such ingredients are extenders, fillers, pigments, dyes, plasticizers, driers, stabilizers, etc. Obviously, there are many cases in which these ingredients are not required or desired, and excellent results are achieved when only the cross-linking agent is added.

As stated above, the use of polysulfonazide cross-linking agents is particularly advantageous in coating compositions prepared from the above polymers.

The following examples are presented for purposes of illustration, parts and percentages being by weight unless otherwise specified. A solubility test was used in the examples to evaluate the effectiveness of the polysulfonazides as cross-linking agents. Cross-linked compositions are no longer soluble in active solvents.

EXAMPLES 1–3

Three samples of nitrocellulose coating compositions were cross-linked with different disulfonazides. The formulation of each sample is shown in Table I.

TABLE I

| Ingredients | Example Number | | | | | | | | |
|---|---|---|---|---|---|---|---|---|---|
| | 1 | 1A | 1B | 2 | 2A | 2B | 3 | 3A | 3B |
| Nitrocellulose [1] (parts) | 20 | 20 | 20 | 14 | 14 | 14 | 8 | 8 | 8 |
| Coconut oil (parts) | 20 | 20 | 20 | | | | | | |
| Drying alkyd [2] (parts) | | | | 42 | 42 | 42 | | | |
| Nondrying alkyd [3] (parts) | | | | | | | 42 | 42 | 42 |
| Toluene (parts) | 30 | 30 | 30 | 21 | 21 | 21 | 12 | 12 | 12 |
| Ethanol (parts) | 9 | 9 | 9 | 7 | 7 | 7 | 4 | 4 | 4 |
| Ethyl acetate (parts) | 9 | 9 | 9 | 7 | 7 | 7 | 4 | 4 | 4 |
| Butyl acetate (parts) | 12 | 12 | 12 | 9 | 9 | 9 | 30 | 30 | 30 |
| Phenyl-β-naphthyl-amine (anti-oxidant) (parts) | | | | 1.1 | 1.1 | 1.1 | | | |
| 1,10-decane bis (sulfonazide) [4] (parts) | | 4 | | | 5.6 | | | 3.3 | |
| 1,3-benzene bis (sulfonazide) [4] (parts) | | | 4 | | | 5.6 | | | 3.3 |

[1] Contains 12% nitrogen and has a viscosity, by the falling ball method, of ½ second.
[2] Glyceryl phthalate alkyd modified with 56% linseed oil (100% solids).
[3] Pentaerythritol phthalate alkyd modified with coconut oil (60% solids in toluene).
[4] Dissolved in acetone.

The resulting compositions were spread on glass plates and allowed to air dry. Then they were baked at a temperature of 150° C. Each of the resulting films was tested for solubility by tumbling for 18 hours in butyl acetate at a temperature of 25° C. (1 gm. film in 100 ml. of solvent). The period of time the films were baked and their solubility is tabulated below.

| Period of baking (hrs.) | Example Number | | | | | | | | |
|---|---|---|---|---|---|---|---|---|---|
| | 1 | 1A | 1B | 2 | 2A | 2B | 3 | 3A | 3B |
| 1 | S* | | I* | S | | I | S | | I |
| 2 | S | I | | S | I | | S | I | |

*S=soluble, I=insoluble.

EXAMPLES 4 AND 5

Two samples of saturated alkyd baking enamels were cross-linked with different disulfonazides. The formulation of each sample is shown in Table II.

TABLE II

| Ingredients | Example Number | | | | | |
|---|---|---|---|---|---|---|
| | 4 | 4A | 4B | 5 | 5A | 5B |
| Nondrying alkyd [1] (parts) | 1.7 | 1.7 | 1.7 | | | |
| Nondrying alkyd [2] (parts) | | | | 1.7 | 1.7 | 1.7 |
| Toluene (parts) | 3.8 | 3.8 | 3.8 | 3.8 | 3.8 | 3.8 |
| 1,10-decane bis (sulfonazide) [3] (parts) | | 0.1 | | | 0.1 | |
| 1,3-benzene bis (sulfonazide) [3] (parts) | | | 0.1 | | | 0.1 |

[1] Pentaerythritol phthalate alkyd modified with coconut oil (60% solids in toluene).
[2] Sebacic acid alkyd modified with 50% castor oil (60% solids in toluene).
[3] Dissolved in acetone.

The resulting enamels were spread on glass plates and allowed to air dry overnight. Each sample was then baked at a temperature of 150° C. and tested for solubility by tumbling for 18 hours in a solvent at a temperature of 25° C. (1 gm. of film in 100 ml. of solvent). The period of time the films were baked, the solvent in which they were tested and their solubility is tabulated below.

| | Example Number | | | | | |
|---|---|---|---|---|---|---|
| | 4 | 4A | 4B | 5 | 5A | 5B |
| Test Solvent | Butyl acetate | | | Toluene | | |
| Period of baking (hrs.): | | | | | | |
| 1 | S | | I | S | | I |
| 2 | S | I | | S | I | |

EXAMPLES 6 AND 7

Two samples of triallyl pentaerythritol derivatives were cross-linked with different disulfonazides. The formulation of each sample is shown in Table III.

TABLE III

| Ingredients | Example Number | | | | | |
|---|---|---|---|---|---|---|
| | 6 | 6A | 6B | 7 | 7A | 7B |
| Ether of diallylidene pentaerythritol with triallyl pentaerythritol [1] (parts) | 10 | 10 | 10 | | | |
| Ester of triallyl pentaerythritol and linseed acids (parts) | | | | 10 | 10 | 10 |
| Phenyl β-naphthylamine (anti-oxidant) (parts) | 0.2 | 0.2 | 0.2 | 0.2 | 0.2 | 0.2 |
| 1,10-decane bis (sulfonazide) [2] (parts) | | 0.1 | | | 0.1 | |
| 1,3-benzene bis (sulfonazide) [2] (parts) | | | 0.1 | | | 0.1 |

[1] Reacted in a ratio of 1 mole of diallyidene pentaerythritol to 2 moles of triallyl pentaerythritol.
[2] Dissolved in acetone.

The resulting compositions were spread on glass plates and allowed to air dry. Each sample was then baked at a temperature of 150° C. and tested for solubility by tumbling for 18 hours in butyl acetate at a temperature of 25° C. (1 gm. of film in 100 ml. of solvent). The period of time the films were baked and their solubility is tabulated below.

| Period of baking (hrs.) | Example Number | | | | | |
|---|---|---|---|---|---|---|
| | 6 | 6A | 6B | 7 | 7A | 7B |
| 1 | S | | I | S | | I |
| 2 | S | I | | S | I | |

EXAMPLES 8–11

Four samples of ethyl cellulose coating compositions were cross-linked with different disulfonazides. The formulation of each sample is shown in Table IV.

TABLE IV

| Ingredients | Example Number | | | | | | | | | | | |
|---|---|---|---|---|---|---|---|---|---|---|---|---|
| | 8 | 8A | 8B | 9 | 9A | 9B | 10 | 10A | 10B | 11 | 11A | 11B |
| Ethyl cellulose [1] (parts) | 15 | 15 | 15 | 15 | 15 | 15 | 10 | 10 | 10 | 15 | 15 | 15 |
| Coconut oil (parts) | 15 | 15 | 15 | | | | | | | | | |
| Nondrying alkyd [2] (parts) | | | | 15 | 15 | 15 | | | | | | |
| Paraffin wax (parts) | | | | | | | 10 | 10 | 10 | | | |
| Mineral oil (parts) | | | | | | | | | | 15 | 15 | 15 |
| Toluene (parts) | 56 | 56 | 56 | 56 | 56 | 56 | 32 | 32 | 32 | 56 | 56 | 56 |
| Ethanol (parts) | 14 | 14 | 14 | 14 | 14 | 14 | 8 | 8 | 8 | 14 | 14 | 14 |
| Carbon tetrachloride (parts) | | | | | | | 40 | 40 | 40 | | | |
| 1,10-decane bis(sulfonazide) [3] (parts) | | 3 | | | 3 | | | 2 | | | 3 | |
| 1,3-benzene bis(sulfonazide) [3] (parts) | | | 3 | | | 3 | | | 2 | | | 3 |

[1] Having an ethoxyl content of approximately 48.25% and a viscosity of approximately 9.5 cps.
[2] Commercial rosin derived alkyd type resin (softening point 70–76° C.).
[3] Dissolved in acetone.

The resulting compositions were spread on glass plates and allowed to air dry. Each sample was then baked at a temperature of 150° C. and tested for solubility by tumbling for 18 hours in a mixture of 80 parts of toluene and 20 parts of ethanol at a temperature of 25° C. The period of time the films were baked and their solubility is tabulated below.

The resulting compositions were spread on glass plates and allowed to air dry. Each sample was then baked at a temperature of 150° C. and tested for solubility by

| Period of baking (hrs.) | Example Number | | | | | | | | | | | |
|---|---|---|---|---|---|---|---|---|---|---|---|---|
| | 8 | 8A | 8B | 9 | 9A | 9B | 10 | 10A | 10B | 11 | 11A | 11B |
| 1 | S | | I | S | | I | S | | I | S | | I |
| 2 | S | I | | S | I | | S | I | | S | I | |

EXAMPLES 12-17

Six samples of chlorinated rubber coating compositions were cross-linked with different disulfonazides. The formulation of each sample is shown in Table V.

tumbling for 18 hours in methyl ethyl ketone at a temperature of 25° C. The period of time the films were baked and their solubility is tabulated below.

TABLE V

| Ingredients | Example Number | | | | | | | | | | | | | | |
|---|---|---|---|---|---|---|---|---|---|---|---|---|---|---|---|
| | 12 | 12A | 13 | 13A | 14 | 14A | 14B | 15 | 15A | 15B | 16 | 16A | 17 | 17A | 17B |
| Chlorinated natural rubber [1] | 20 | 20 | 20 | 20 | 24 | 24 | 24 | 21 | 21 | 21 | 25 | 25 | 25 | 25 | 25 |
| Dioctyl phthalate | 20 | 20 | | | | | | | | | | | | | |
| Methyl methacrylate—ethyl acrylate copolymer [2] | | | 20 | 20 | | | | | | | | | | | |
| Nondrying alkyd [3] | | | | | 24 | 24 | 24 | | | | | | | | |
| Semidrying alkyd [4] | | | | | | | | 21 | 21 | 21 | | | | | |
| Coconut oil | | | | | | | | | | | 25 | 25 | | | |
| Soybean oil | | | | | | | | | | | | | 25 | 25 | 25 |
| Phenyl β-naphthylamine (anti-oxidant) | | | | | | | | 0.8 | 0.8 | 0.8 | | | | | |
| Toluene | 60 | 60 | 60 | 60 | 36 | 36 | 36 | 49 | 49 | 49 | 50 | 50 | 50 | 50 | 50 |
| Xylene | | | | | 16 | 16 | 16 | 9 | 9 | 9 | | | | | |
| 1,10-decane bis(sulfonazide) [5] | | | | | | | 4.8 | | | 4.2 | | | | 5.0 | |
| 1,3-benzene bis(sulfonazide) [5] | | 4.0 | | 4.0 | | 4.8 | | | 4.2 | | | 5.0 | | | 5.0 |

[1] Having a chlorine content of approximately 67% and a viscosity of approximately 11.5 cps.
[2] Containing 60 mole percent of methacrylate and having a molecular weight of approximately 100,000.
[3] Pentaerythritol phthalate alkyd modified with coconut oil (60% solids in xylene).
[4] Glyceryl phthalate alkyd modified with 55% dehydrated castor oil (70% solids in xylene).
[5] Dissolved in acetone.

The resulting compositions were spread on glass plates and allowed to air dry. Each sample was then baked at a temperature of 150° C. and tested for solubility by tumbling for 18 hours in toluene at a temperature of 25° C. The period of time the films were baked and their solubility is tabulated below.

| Period of time (hrs.) | 18 | 18A | 18B |
|---|---|---|---|
| 1 | S | | I |
| 2 | S | I | |

| Period of baking (hrs.) | Example Number | | | | | | | | | | | | | | |
|---|---|---|---|---|---|---|---|---|---|---|---|---|---|---|---|
| | 12 | 12A | 13 | 13A | 14 | 14A | 14B | 15 | 15A | 15B | 16 | 16A | 17 | 17A | 17B |
| 1 | S | I | S | I | S | | I | S | | I | S | I | S | | I |
| 2 | | | | | S | I | | S | I | | | | S | I | |

EXAMPLE 18

A sample of a vinylidene chloride-acrylonitrile copolymer containing approximately 88% vinylidene chloride and having a molecular weight of approximately 70,000 was cross-linked with different disulfonazides. The formulation of each sample is shown below.

| Ingredients | Example Number | | |
|---|---|---|---|
| | 18 | 18A | 18B |
| Vinylidene chloride—acrylonitrile copolymer (parts) | 10 | 10 | 10 |
| Methyl ethyl ketone (parts) | 40 | 40 | 40 |
| 1,10-decane bis(sulfonazide) [1] (parts) | | 1.0 | |
| 1,3-benzene bis(sulfonazide) [1] (parts) | | | 1.0 |

[1] Dissolved in acetone.

EXAMPLE 19

A sample of poly(ethylene oxide) having a molecular weight of approximately 100,000 was cross-linked with 1,3-benzene bis(sulfonazide) in the following formulation.

| | 19 | 19A |
|---|---|---|
| Poly(ethylene oxide) (parts) | 10 | 10 |
| Benzene (parts) | 40 | 40 |
| 1,3-Benzene bis(sulfonazide) [1] (parts) | | 1.0 |

[1] Dissolved in acetone.

The resulting compositions were spread on glass plates and allowed to air dry. Each sample was then baked for 1 hour at a temperature of 150° C. The resulting films were tested for solubility by tumbling for 18 hours in benzene at a temperature of 25° C. The sample containing the disulfonazide (19A) was insoluble while the control (19) was completely soluble.

What we claim and desire to protect by Letters Patent is:

1. A process of cross-linking a polymer selected from the group consisting of nitrocellulose, ethyl cellulose, saturated alkyd resins, triallyl pentaerythritol ethers, triallyl pentaerythritol esters, chlorinated natural rubber, poly(ethylene oxide), and vinylidene chloride-acrylonitrile copolymers, which comprises heating said polymer at a temperature of from about 100° C. to about 250° C. in admixture with from about 0.1% to about 25% by weight of a polysulfonazide cross-linking agent having the formula $R(SO_2N_3)_x$ where $x$ is an integer greater than 1 and R is an organic radical inert to the cross-linking reactions.

2. The process of claim 1 wherein the polymer is nitrocellulose.

3. The process of claim 1 wherein the polymer is ethyl cellulose.

4. The process of claim 1 wherein the polymer is a saturated phthalic acid alkyd.

5. The process of claim 1 wherein the polymer is a triallyl pentaerythritol ether.

6. The process of claim 1 wherein the polymer is a triallyl pentaerythritol ester.

7. The process of claim 1 wherein the polymer is a chlorinated natural rubber.

8. The process of claim 1 wherein the polymer is poly(ethylene oxide).

9. The process of claim 1 wherein the polymer is vinylidene chloride-acrylonitrile copolymer.

10. The process of claim 1 wherein the polysulfonazide is 1,10-decane bis(sulfonazide).

11. The process of claim 1 wherein the polysulfonazide is 1,3-benzene bis(sulfonazide).

12. A polymer selected from the group consisting of nitrocellulose, ethyl cellulose, saturated alkyd resins, triallyl pentaerythritol ethers, triallyl pentaerythritol esters, chlorinated natural rubber, poly(ethylene oxide), and vinylidene chloride-acrylonitrile copolymers cross-linked with a polysulfonazide having the formula $R(SO_2N_3)_x$ where $x$ is an integer greater than 1 and R is an organic radical inert to the cross-linking reactions.

References Cited

UNITED STATES PATENTS

| 3,137,745 | 6/1964 | Johnstone | 260—2 |
| 3,211,752 | 10/1965 | Breslow | 260—2.5 |
| 3,261,785 | 7/1966 | Robinson | 260—349 |

OTHER REFERENCES

Handbook of Chemistry by Lange, N., 8th ed., 1952 (page 814 relied on).

WILLIAM H. SHORT, *Primary Examiner.*

T. PERTILLA, *Assistant Examiner.*